(12) United States Patent
Zhang et al.

(10) Patent No.: US 8,295,464 B2
(45) Date of Patent: Oct. 23, 2012

(54) METHOD, SYSTEM AND APPARATUS FOR IMPLEMENTING RINGBACK TONE SERVICE

(75) Inventors: Zhifeng Zhang, Shenzhen (CN); Qingchun Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 916 days.

(21) Appl. No.: 12/098,072

(22) Filed: Apr. 4, 2008

(65) Prior Publication Data
US 2008/0198976 A1 Aug. 21, 2008

Related U.S. Application Data

(63) Continuation of application No. PCT/CN2007/070636, filed on Sep. 5, 2007.

(30) Foreign Application Priority Data

Feb. 7, 2007 (CN) .......................... 2007 1 0000465

(51) Int. Cl.
*H04M 3/42* (2006.01)
(52) U.S. Cl. ............................... 379/207.16; 379/373.01
(58) Field of Classification Search .................... 379/69, 379/211.02, 142.01
See application file for complete search history.

(56) References Cited

U.S. PATENT DOCUMENTS

| | | | |
|---|---|---|---|
| 2002/0183048 A1 | 12/2002 | Takeuchi | |
| 2004/0120494 A1* | 6/2004 | Jiang et al. | ............... 379/210.01 |
| 2006/0109970 A1 | 5/2006 | Shim et al. | |
| 2006/0133353 A1 | 6/2006 | Wang et al. | |
| 2006/0147016 A1* | 7/2006 | Moody et al. | ............ 379/211.02 |
| 2006/0153355 A1 | 7/2006 | Wang et al. | |
| 2008/0192900 A1 | 8/2008 | Liu | |

FOREIGN PATENT DOCUMENTS

| | | |
|---|---|---|
| CN | 1520211 A | 8/2004 |
| CN | 1556645 A | 12/2004 |
| CN | 1688151 | 10/2005 |

(Continued)

OTHER PUBLICATIONS

Extended European Search Report regarding Application No. 07801045.1-2414 PCT/CN2007070636, dated Jun. 12, 2009.

(Continued)

*Primary Examiner* — Curtis Kuntz
*Assistant Examiner* — Amal Zenati
(74) *Attorney, Agent, or Firm* — Harness, Dickey & Pierce, P.L.C.

(57) ABSTRACT

A method for implementing the ringback tone (RBT) service based on the next generation network (NGN) includes: an application server (AS) receives from a softswitch (SX) a call request initiated by a ring-to-me subscriber, which carries a ring-to-me access code; the AS obtains the ring-to-me tone ID from the RBT platform according to the ring-to-me access code and instructs a media resource server (MRS) to play the tone indicated by the ring-to-me tone ID to the calling party. Various embodiments disclose a system, an AS and an MRS for implementing RBT based on NGN. The present disclosure enables a calling party to listen to a ring-to-me tone while the called party is alerted and further, it enables the calling party to choose to listen to a ring-to-me tone or a ring-to-you tone according to the calling party's precedence setting.

14 Claims, 3 Drawing Sheets

FOREIGN PATENT DOCUMENTS

| | | | |
|---|---|---|---|
| CN | 1798137 | A | 7/2006 |
| CN | 1822619 | A | 8/2006 |
| CN | 1832518 | A | 9/2006 |
| CN | 1852360 | | 10/2006 |
| CN | 1859449 | A | 11/2006 |
| CN | 1889604 | A | 1/2007 |
| CN | 100512465 | C | 9/2007 |
| EP | 1686781 | A1 | 8/2006 |
| WO | WO-2004036944 | A1 | 4/2004 |
| WO | WO-2004107722 | A1 | 12/2004 |
| WO | WO 2007100178 | A1 * | 9/2007 |
| WO | WO-2008095385 | A1 | 8/2008 |

OTHER PUBLICATIONS

J. Rosenberg et al. "SIP: Session Initiation Protocol" The Internet Society. Network Working Group. Jun. 2002.

M. Handley and V. Jacobson. "SDP: Session Description Protocol" The Internet Society. Network Working Group. Apr. 1998.

Second Office Action regarding Chinese Application No. 2007100004657, mailed Jan. 9, 2009. Translation provided by Huawei Technologies Co., Ltd.

Written Opinion of the International Searching Authority regarding Application No. PCT/CN2007/070636, mailed Dec. 13, 2007. Translation provided by Huawei Technologies Co., Ltd.

European Office Action regarding Application No. 07 801 045.1-2414, dated Jan. 26, 2012.

Jeongyun Kim et al. "NGN Architecture for Supporting Composite Services." pp. 524-527, 2003.

Keith Knightson et al. "NGN Architecture: Generic Principles, Functional Architecture, and Implementation." IEEE Communications Magazine. Oct. 2005. pp. 49-56.

International Search Report regarding Application No. PCT/CN2007/070636, mailed Dec. 13, 2007. Translation provided by Huawei Technologies Co., Ltd.

* cited by examiner

METHOD, SYSTEM AND APPARATUS FOR IMPLEMENTING RINGBACK TONE SERVICE

CROSS-REFERENCE TO RELATED APPLICATIONS

This application is a continuation of International Application No. PCT/CN2007/070636 filed on Sep. 5, 2007. This application claims the benefit of Chinese Patent Application No. 200710000465.7 filed on Feb. 7, 2007. The disclosures of the above applications are incorporated herein by reference.

FIELD

The present disclosure relates to ringback technologies and particularly to a method, system, and apparatus for implementing the ringback tone (RBT) service.

BACKGROUND

The statements in this section merely provide background information related to the present disclosure and may not constitute prior art.

With the development of networks, people demand more and more communications and value-added services (VASs) are increasingly diversified. Yet over nearly one hundred years since the invention of telephone, the RBT has remained a tedious sound of "toot . . . toot . . . ". In this age of personality, people wish that those who call them do not hear this tedious "toot . . . toot . . . " any more. This brings a huge opportunity for VAS providers. With the advent of the next generation network (NGN) era, network bandwidth increases, network capabilities are enhanced and functionalities are richer. Based on NGN, colorful RBTs like a song, a cartoon, or a movie clip, are available to subscribers, satisfying their personalized requirements.

The current RBT service is customized by a called party to play a piece of music, a greeting, or an announcement recorded by the called party, to a calling party. It is a ring-to-you service.

In an NGN network, main equipment for implementing the ring-to-you service includes: a called party's softswitch (SX), adapted to directly connect the calling party and the called party to set up a call session between the calling party and the called party; an application server (AS), adapted to provide the ring-to-you service; an RBT platform, adapted to manage RBT files in a uniform manner; a media resource server (MRS), adapted to store RBT files and play ring-to-you tones to the calling party; a smart home location register (SHLR), adapted to store the information of ring-to-you service subscription of subscribers.

The method for implementing the ring-to-you service is shown in FIG. 1, which gives a ring-to-you service flow in the prior art. The method includes:

Step 101: A calling party calls a called party and sends a call request to the called party's SX.

Step 102: The called party's SX sends the called number to the SHLR, querying whether the called party has subscribed to the ring-to-you service. If the SHLR sends a ring-to-you access code in response, the called party's SX adds the ring-to-you access code ahead of the called number and sends the called number to the AS.

Step 103: The AS determines that the called party is a ring-to-you subscriber according to the ring-to-you access code and sends the called number back to the called party's SX to page the called party.

Step 104: The called party's SX routes the call to the called party.

Step 105: The called party is alerted and sends an Alert (Ringing) message to the called party's SX.

Step 106: The called party's SX forwards the Ringing message to the AS.

Step 107: The AS obtains the ring-to-you tone ID from the RBT platform via the tone query interface and resolves the address where the ring-to-you tone file is stored from the ring-to-you tone ID.

Step 108: The AS sends the address to the MRS, requesting the MRS to play the indicated tone to the calling party.

Step 609: The MRS obtains the ring-to-you tone file according to the received address and plays the ring-to-you tone to the calling party.

The called party answers and the following steps continue:

Step 110: The called party answers and sends an OK message to the called party's SX.

Step 111: The called party's SX forwards the OK message to the AS, notifying that the called party is connected.

Step 112: The AS sends a BYE message to the MRS and the MRS stops playing the ring-to-you tone.

Step 113: The calling party and the called party perform bidirectional negotiation under the control of the AS and start a normal conversation.

In the prior art, when the calling party calls the called party, the calling party can only passively listen to the ring-to-you tone customized by the called party. If the called party has not customized a ring-to-you tone, the calling party only hears a sound of "toot . . . toot . . . ".

SUMMARY

The present disclosure provides a method for implementing RBT based on NGN. The method enables a calling party to listen to a tone customized by the calling party while the called party is alerted. The method includes: receiving, by an AS, from an SX a call request initiated by a ring-to-me subscriber, which carries a ring-to-me access code; and by the AS, obtaining a ring-to-me tone ID from an RBT platform according to the ring-to-me access code and instructing an MRS to play the tone indicated by the tone ID to the calling party.

In various embodiments, a method for implementing RBT based on NGN enables a calling party to listen to a tone customized by the calling party or a tone customized by a called party according to the calling party's presetting while the called party is alerted. The method includes: receiving, by an AS, from an SX a call request initiated by a ring-to-me subscriber, which carries a ring-to-me access code; and by the AS, authenticating the calling number, obtaining the calling party's RBT precedence information, obtaining the RBT ID and instructing an MRS to play the RBT to the calling party according to the precedence information.

In various embodiments, a system for implementing RBT based on NGN enables a calling party to listen to a tone customized by the calling party while the called party is alerted. The system includes an SX, an AS, an RBT platform and an MRS, wherein: the SX is adapted to send to the AS a call request initiated by a ring-to-me subscriber, which carries a ring-to-me access code; the AS is adapted to obtain a ring-to-me tone ID from the RBT platform according to the ring-to-me access code and instruct the MRS to play the tone indicated by the tone ID to the calling party; and the MRS is adapted to play the tone indicated by the ring-to-me tone ID to the calling party according to the instruction of the AS.

In various embodiments, an AS for implementing RBT based on NGN includes a ring-to-me tone ID obtaining module and a play instructing module, wherein: the ring-to-me tone ID obtaining module is adapted to obtain a ring-to-me tone ID from the RBT platform according to the ring-to-me access code and send the ring-to-me tone ID to the play instructing module; and the play instructing module is adapted to instruct an MRS to play the tone indicated by the received ring-to-me tone ID to the calling party.

In various embodiments, an MRS for implementing RBT based on NGN includes an RBT storage module and a ring-to-me tone play module. The RBT storage module is adapted to store RBT files.

The ring-to-me tone play module is adapted to receive the instruction from an AS which instructs it to play the tone indicated by a ring-to-me tone ID to the calling party, and play the tone indicated by the ring-to-me tone ID to the calling party.

According to the present disclosure, the AS obtains a ring-to-me tone ID from the RBT platform and instructs the MRS to play the tone indicated by the ring-to-me tone ID to the calling party. With the technical solutions, the calling party may customize an RBT with the corresponding RBT file stored in the MRS and the ring-to-me tone ID stored in the RBT platform. Then, the AS can obtain the ring-to-me tone ID from the RBT platform and instruct the MRS to play the tone indicated by the ring-to-me tone ID to the calling party. In various embodiments a calling party may listen to a tone customized by the calling party instead of listening to a ring-to-you tone or the ordinary "toot . . . toot . . . ". Moreover, in various embodiments a calling party may listen to a ring-to-me tone or a ring-to-you tone according to presetting of the calling party while the called party is alerted.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. To make the technical solution and advantages of the present disclosure clearer, the following describes various embodiments of the present disclosure in detail with reference to the accompanying drawings.

Figure 1:
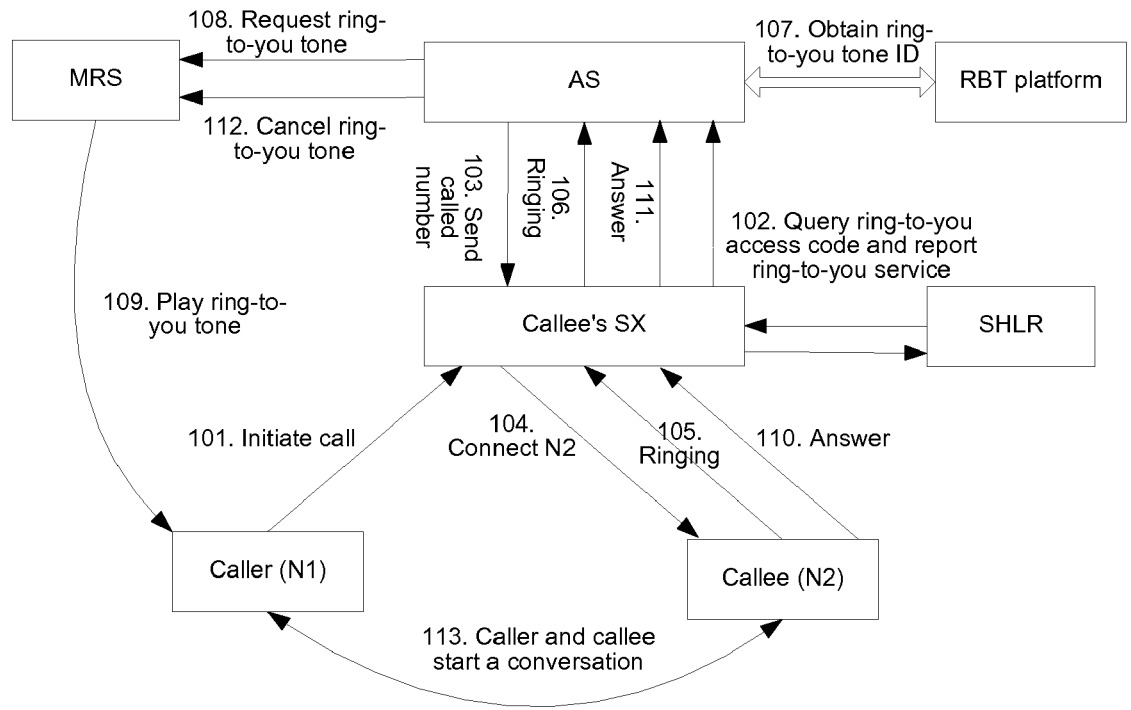
FIG. 1 shows a flowchart for implementing the ring-to-you service in the prior art.
Figure 2:
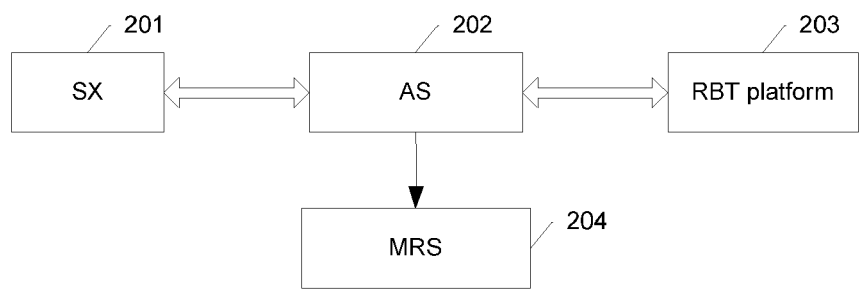
FIG. 2 shows the structure of a system for implementing RBT based on NGN according to the present disclosure.

As shown in FIG. 2, a system for implementing RBT based on NGN according to various embodiments of the present disclosure includes: an SX 201, an AS 202, an RBT platform 203 and an MRS 204. The SX 201 is adapted to send the AS 202 a call request initiated by a ring-to-me subscriber, which carries a ring-to-me access code. The AS 202 is adapted to obtain a ring-to-me tone ID from the RBT platform 203 according to the ring-to-me access code and instruct the MRS 204 to play the tone indicated by the tone ID to the calling party. The MRS 204 is adapted to play the tone indicated by the ring-to-me tone ID to the calling party according to the instruction of the AS 202.

Figure 3:
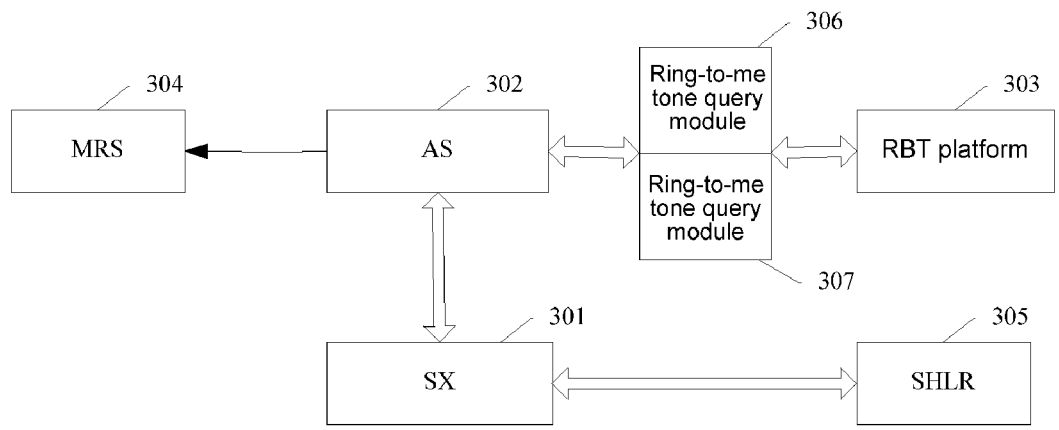
FIG. 3 shows the structure of a system for implementing RBT according to the present disclosure.

Based on the structure shown in FIG. 2, the present disclosure may have a variety of implementations in different scenarios. For example, FIG. 3 shows the structure of a system for implementing RBT according to various embodiments of the present disclosure. As shown in FIG. 3, the system includes an SX 301, an AS 302, an RBT platform 303, an MRS 304, an SHLR 305, a ring-to-me tone query module 306 and a ring-to-you tone query module 307.

The SX 301 is adapted to send the calling number to the SHLR 305 to query whether the calling party has subscribed to the ring-to-me service and after the SHLR 305 sends a ring-to-me access code in response, send a call request that carries the ring-to-me access tone to the AS 302.

The AS 302 is adapted to authenticate the calling number when receiving the ring-to-me access code and determine whether the RBT precedence information preset by the calling party indicates calling party precedence or called party precedence: in case of calling party precedence, the AS 302 obtains the ring-to-me tone ID from the RBT platform 303 and instructs the MRS 304 to play the tone indicated by the ring-to-me tone ID to the calling party; in case of called party precedence, the AS 302 obtains the ring-to-you tone ID from the RBT platform 303 and instructs the MRS 304 to play the tone indicated by the ring-to-you tone ID to the calling party.

The RBT platform 303 is adapted to store ring-to-me tone IDs and ring-to-you tone IDs of subscribers and provide the AS 302 with ring-to-me tone IDs and ring-to-you tone IDs.

The MRS 304 is adapted to play the tone indicated by a ring-to-you tone ID or a ring-to-me tone ID to the calling party.

The SHLR 305 is adapted to determine whether the calling party indicated by the received calling number has subscribed to the ring-to-me service and if so, send the ring-to-me access code to the SX 301.

Between the AS 302 and the RBT platform 303 are the ring-to-me tone query module 306 and ring-to-you tone query module 307, adapted respectively to send the ring-to-me tone ID and ring-to-you tone ID to the AS 302.

Various embodiments of the present disclosure provide an AS for implementing RBT based on NGN. The AS is adapted to obtain the ring-to-me tone ID from the RBT platform and instruct the MRS to play the tone indicated by the tone ID to the calling party.

Figure 4:
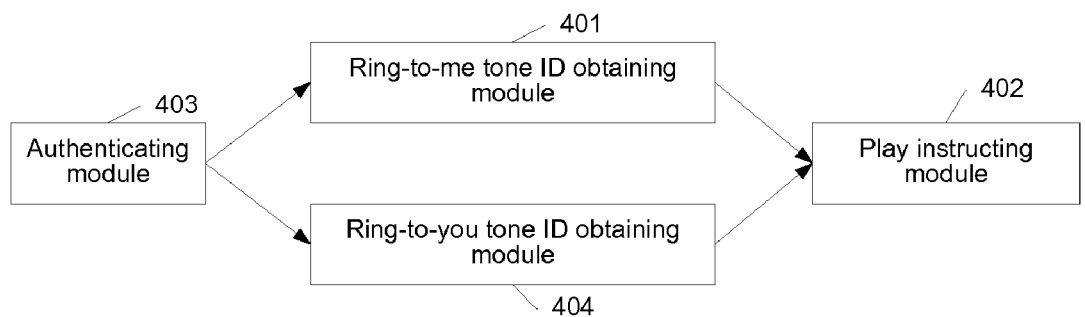
FIG. 4 shows the structure of an AS according to the present disclosure.

FIG. 4 shows the structure of an AS according to various embodiments of the present disclosure. As shown in FIG. 4, the AS includes a ring-to-me tone ID obtaining module 401 and a play instructing module 402. The ring-to-me tone ID obtaining module 401 is adapted to obtain a ring-to-me tone ID according to the ring-to-me access code and send the ring-to-me tone ID to the play instructing module 402. The play instructing module 402 is adapted to instruct an MRS to play the tone indicated by the received ring-to-me tone ID to the calling party. The AS further includes authenticating module 403 and ring-to-you tone ID obtaining module 404.

The authenticating module 403 is adapted to authenticate the calling number and obtain the RBT precedence information of the calling party: if the RBT precedence information indicates calling party precedence, it instructs the ring-to-me tone ID obtaining module 401 to obtain a ring-to-me tone ID from the RBT platform; if the RBT precedence information indicates called party precedence, it instructs the ring-to-you tone ID obtaining module 404 to obtain a ring-to-you tone ID from the RBT platform.

The ring-to-me tone ID obtaining module 401 is further adapted to obtain a ring-to-me tone ID from the RBT platform and send the ring-to-me tone ID to the play instructing module 402 when the RBT precedence information obtained by the authenticating module 403 indicates calling party precedence.

The ring-to-you tone ID obtaining module 404 is adapted to obtain a ring-to-you tone ID from the RBT platform and send the ring-to-you tone ID to the play instructing module 402 when the RBT precedence information obtained by the authenticating module 403 indicates called party precedence.

The play instructing module 402 is further adapted to instruct an MRS to play the tone indicated by the received ring-to-you tone ID to the calling party.

Figure 5:
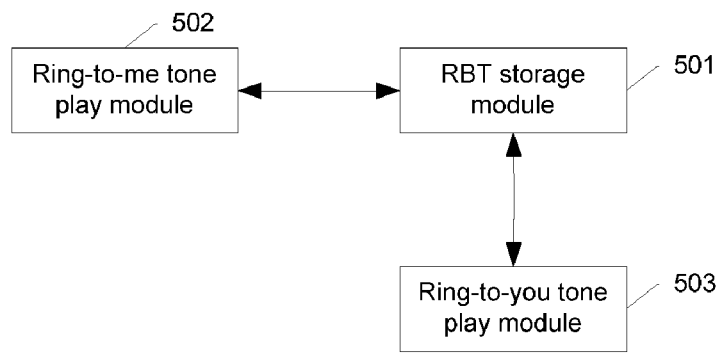
FIG. 5 shows the structure of an MRS according to the present disclosure.

Various embodiments of the present disclosure provide an MRS for implementing RBT based on NGN. The MRS is adapted to play a tone indicated by the ring-to-me tone ID to the calling party according to the instruction of the AS. FIG. 5 shows the structure of an MRS according to various embodiments of the present disclosure.

As shown in FIG. 5, the MRS includes an RBT storage module 501 and a ring-to-me tone play module 502. The RBT storage module 501 is adapted to store RBT files. The ring-to-me tone play module 502 is adapted to receive the instruction from an AS which instructs it to play the tone indicated by a ring-to-me tone ID to the calling party, and play the tone indicated by the ring-to-me tone ID to the calling party.

The MRS further includes a ring-to-you tone play module 503, which is adapted to receive an instruction from the AS for playing a tone indicated by a ring-to-you tone ID to the calling party, and play the tone indicated by the ring-to-you tone ID to the calling party according to the instruction.

Based on the above structure, various embodiments of the present disclosure provide a method for implementing RBT based on NGN. The method includes: an AS receives from an SX a call request initiated by a ring-to-me subscriber, which carries a ring-to-me access code; and the AS obtains a ring-to-me tone ID from an RBT platform according to the ring-to-me access code and instructs an MRS to play the tone indicated by the tone ID to the calling party.

The method may further include: the SX obtains a ring-to-me access code from an SHLR. In the method, the step of the AS instructing the MRS to play a tone indicated by the ring-to-me tone ID to the calling party is: the AS resolves the address where the RBT file is stored according to the ring-to-me tone ID and sends the address to the MRS; and the MRS obtains the RBT file according to the address and plays the tone to the calling party.

Based on the above structure, various embodiments of the present disclosure provide another method for implementing RBT based on NGN. The method includes: an AS receives from an SX a call request initiated by a ring-to-me subscriber, which carries a ring-to-me access code; and the AS authenticates the calling number, obtains the calling party's RBT precedence information, and according to the precedence information, obtains the RBT ID and instructs an MRS to play the RBT to the calling party. The method may further include: the SX obtains a ring-to-me access code from an SHLR.

In the above method, the step of instructing the MRS to play a tone to the calling party includes: when the RBT precedence information indicates calling party precedence, the AS obtains a ring-to-me tone ID from the RBT platform and instructs the MRS to play the tone indicated by the ring-to-me tone ID to the calling party; and when the RBT precedence information indicates called party precedence, the AS obtains a ring-to-you tone ID from the RBT platform and instructs the MRS to play the tone indicated by the ring-to-you tone ID to the calling party.

Figure 6:
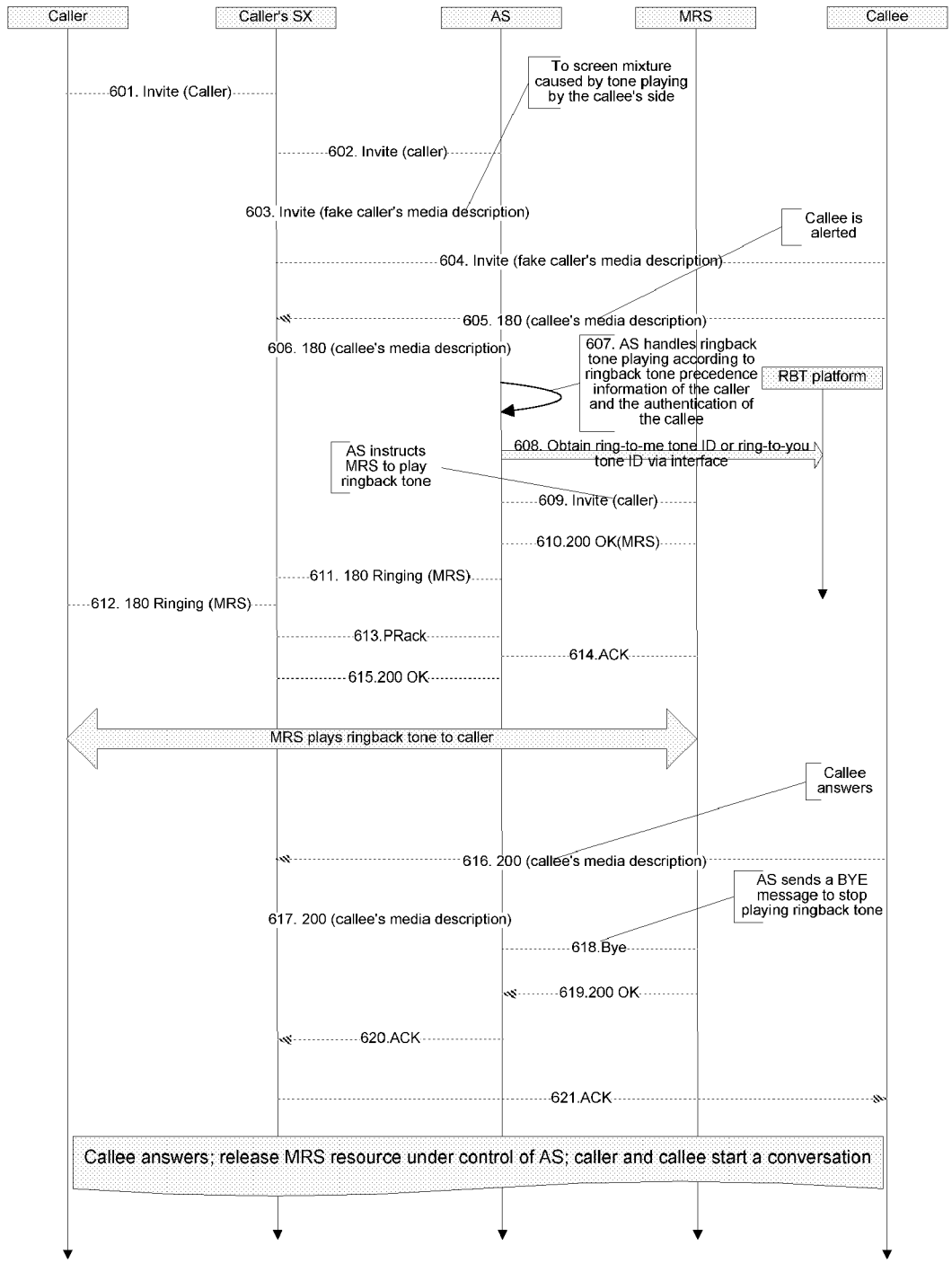
FIG. 6 shows a flowchart for implementing RBT based on NGN and Session Initiation Protocol (SIP) according to the present disclosure.

FIG. 6 shows a flowchart for implementing RBT based on NGN and SIP according to various embodiments of the present disclosure. As shown in FIG. 6, the calling party has subscribed to the ring-to-me service and the second method embodiment is adopted to play to the calling party a ring-to-me tone or a ring-to-you tone according the calling party's presetting of RBT precedence. The detailed procedure is as follows:

601: The calling party attempts to call the called party by sending a call request (Invite) message to the calling party's SX.

602: The calling party's SX queries the SHLR to recognize that the calling party has subscribed to the ring-to-me service and forwards the Invite message to the AS.

Specifically, the calling party's SX sends the calling number to the SHLR according to the received Invite message; the SHLR finds that the calling party indicated by the calling number has subscribed to the ring-to-me service and sends the ring-to-me access code to the calling party's SX in response; the calling party's SX inserts the ring-to-me access code into the Invite message and sends it to the AS. After receiving the Invite message that carries the ring-to-me access code, the AS activates the RBT playing procedure upon reception of the Ringing message.

603: The AS sends the called number to the calling party's SX via an Invite message. To avoid the mixture caused by tone playing by the called party's side, the Invite message includes a fake calling party's media description.

604: The calling party's SX forwards the Invite message to the called party and connects the called party.

605: The called party is alerted and reports a 180 (Ringing) message that carries the called party's media description to the calling party's SX.

606: The calling party's SX forwards the 180 (Ringing) message to the AS to activate the RBT playing procedure.

607: The AS handles RBT playing according to the calling party's RBT precedence information and its authentication of the called party:

The AS first determines whether the RBT precedence preset by the calling party indicates calling party precedence or called party precedence.

In case of calling party precedence, the AS queries the RBT platform via the ring-to-me tone ID query module to obtain the ring-to-me tone ID.

In case of called party precedence, the AS authenticates the called party and determines whether the called party has subscribed to the ring-to-you service: if the authentication is successful, the AS queries the RBT platform via the ring-to-you tone query module to obtain the ring-to-you tone ID; otherwise, the AS queries the RBT platform via the ring-to-me tone query module to obtain the ring-to-me tone ID.

The RBT precedence is preset by the calling party. It may indicate calling party precedence or called party precedence. The calling party precedence means that the system plays a tone customized by the calling party to the calling party while the called party is alerted. The called party precedence means that the system plays a tone customized by the called party to the calling party while the called party is alerted.

608: The AS obtains a ring-to-me tone ID or a ring-to-you tone ID from the RBT platform via an interface.

609: The AS sends an Invite message to the MRS, instructing the MRS to play an RBT to the calling party.

610: The MRS sends a 200 OK message in response.

611: The AS sends a 180 (Ringing) message that carries the MRS media description to the calling party's SX.

612: The calling party's SX forwards the 180 (Ringing) message to the calling party.

613: In response to the 180 (Ringing) message received in step 611, the calling party's SX sends a PREACK message to the AS.

614: The AS sends an ACK to the MRS, instructing the MRS to play an RBT to the calling party.

615: In response to the PREACK received in step 613, the AS sends a 200 OK message to the calling party's SX. The MRS plays the RBT to the calling party via a media channel, such as a universal media gateway (UMG).

616: The called party answers and sends a 200 OK message that carries the called party's media description to the calling party's SX.

617: The calling party's SX forwards the 200 OK message to the AS, notifying that the called party is connected.

618: The AS sends a BYE message to the MRS, instructing the MRS to stop the playing.

619-621: The MRS sends a 200 OK message to the AS, the AS sends an ACK to the calling party's SX and the calling party's SX forwards the ACK to the called party. After the MRS resource is released under the control of the AS, the calling party and the called party start a conversation.

The above procedure may also go like this: the calling party does not preset RBT precedence, and the system plays the tone customized by the calling party to the calling party. In this case, in step 607, the AS does not judge whether the RBT precedence indicates calling party precedence or called party precedence, but directly lets the ring-to-me tone query module query the RBT platform to obtain the ring-to-me tone ID.

According to various embodiments of the present disclosure, the method, system, AS and MRS for implementing the ring-to-me service enable a calling party to hear an RBT customized by the calling party. Further, according to various embodiments of the present disclosure, the system may play a tone customized by the calling party or a tone customized by a called party to the calling party according to the calling party's presetting.

Although the present disclosure has been described through various embodiments, the present disclosure is not limited to such embodiments. It is apparent that those skilled in the art can make various modifications and variations to the present disclosure without departing from the spirit and scope of the present disclosure. The present disclosure is intended to cover the modifications and variations provided that they fall in the scope of protection defined by the following claims or their equivalents.

What is claimed is:

1. A method for implementing ringback tone (RBT) based on a next generation network (NGN) comprising:
receiving, by a calling party's softswitch (SX), a first invite message initiated by a calling party;
sending, by the calling party's SX, the calling party's number to a smart home location register (SHLR) according to the received first invite message, and receiving a ring-to-me access code sent by the SHLR;
sending, by the calling party's SX, a call request to an application server (AS), wherein the call request comprises the ring-to-me access code, and receiving a second invite message sent by the AS, wherein the second invite message includes a fake calling party's media description to prevent called party's side from playing ringback tone to the calling party;
forwarding, by the calling party's SX, the second invite message to a called party and connecting the called party;
receiving, by the calling party's SX, a ringing message reported by the called party;
forwarding, by the calling party's SX, the ringing message to the AS;
receiving, by the AS, the ringing message sent from the calling party's SX; and
determining, by the AS, whether RBT precedence preset by the calling party indicates calling party precedence or called party precedence, wherein the calling party precedence indicates that a tone customized by the calling party would be played to the calling party while the called party is alerted, the called party precedence indicates that a tone customized by the called party would be played to the calling party while the called party is alerted;
obtaining, by the AS, a ring-to-me tone ID from an RBT platform if the RBT precedence preset indicates calling party precedence and instructing a media resource server (MRS) to play a tone indicated by the ring-to-me tone ID and customized by the calling party to the calling party; and
obtaining, by the AS, a ring-to-you tone ID from an RBT platform if the RBT precedence preset indicates called party precedence and instructing the MRS to play a tone indicated by the ring-to-you tone ID and customized by the called party to the calling party.

2. The method of claim 1, wherein the step of instructing a media resource server (MRS) to play the tone indicated by the ring-to-me tone ID to the calling party comprises: obtaining, by the AS, an address where a RBT file is stored according to the ring-to-me tone ID and sending the address to the MRS; and
obtaining, by the MRS, the RBT file according to the address and playing the tone to the calling party.

3. The method of claim 1, further comprising:
obtaining, by the AS, a ring-to-you tone ID from the RBT platform if the RBT precedence indicates called party precedence, and instructing the MRS to play a tone indicated by the ring-to-you tone ID to the calling party.

4. A system for implementing ringback tone (RBT) based on a next generation network (NGN) comprising a softswitch (SX), an application server (AS), an RBT platform and a media resource server (MRS), wherein:
the SX is configured to receive a first invite message initiated by a calling party, and send the calling party's number to a smart home location register (SHLR) according to the received first invite message, and receive a ring-to-me access code sent by the SHLR, send to the AS a call request, wherein the call request comprises the ring-to-me access code, receive a second invite message sent by the AS, wherein the second invite message includes a fake calling party's media description to prevent called party's side from playing ringback tone to the calling party, forward the second invite message to a called party and connect the called party, receive a ringing message reported by the called party and forward the ringing message to the AS, wherein the SX is the calling party's SX;

the AS is configured to receive the ringing message sent from the calling party's SX, and determine whether RBT precedence preset by the calling party indicates calling party precedence or called party precedence, wherein the calling party precedence indicates that a tone customized by the calling party would be played to the calling party while the called party is alerted, the called party precedence indicates that a tone customized by the called party would be played to the calling party while the called party is alerted, and obtain a ring-to-me tone ID from the RBT platform if the RBT precedence preset indicates calling party precedence and instruct the MRS to play the tone indicated by the ring-to-me tone ID to the calling party, obtain a ring-to-you tone ID from the RBT platform if the RBT precedence preset indicates called party precedence and instruct the MRS to play the tone indicated by the ring-to-you tone ID to the calling party; and the MRS is configured to play a tone indicated by the ring-to-me tone ID or the ring-to-you tone ID to the calling party according to the instruction of the AS.

5. The system of claim 4, wherein:

the AS is further configured to obtain a ring-to-you tone ID from the RBT platform if the RBT precedence indicates called party precedence and instruct the MRS to play a tone indicated by the ring-to-you tone ID to the calling party; and the MRS is further configured to play the tone indicated by the ring-to-you tone ID to the calling party according to the instruction of the AS.

6. The system of claim 5, further comprising:

a smart home location register (SHLR) configured to send the ring-to-me access code to the SX.

7. The system of claim 6, further comprising:

a ring-to-me tone query module between the AS and the RBT platform, which is configured to send the ring-to-me tone ID.

8. The system of claim 7, further comprising a ring-to-me tone query module and a ring-to-you tone query module between the AS and the RBT platform, wherein:

the ring-to-me tone query module is configured to send the ring-to-me tone ID; and the ring-to-you tone query module is configured to send the ring-to-you tone ID.

9. An application server (AS) for implementing ringback tone (RBT) based on a next generation network (NGN) comprising a ring-to-me tone ID obtaining module, a ring-to-you tone ID obtaining module, an authenticating module, and a play instructing module, wherein:

the authenticating module is configured to receive a call request sent from a calling party's SX, send a second invite message to the calling party's SX, wherein the second invite message includes a fake calling party's media description to prevent called party's side from playing ringback tone to the calling party, authenticate a calling number after receiving a ringing message sent from the calling party's SX and determine whether RBT precedence of the calling party indicates calling party precedence or called party precedence, instruct the ring-to-me tone ID obtaining module to obtain a ring-to-me tone ID from a RBT platform if the RBT precedence indicates calling party precedence, instruct the ring-to-you tone ID obtaining module to obtain a ring-to-you tone ID from the RBT platform if the RBT precedence indicates called party precedence, wherein the calling party precedence indicates that a tone customized by the calling party would be played to the calling party while the called party is alerted, the called party precedence indicates that a tone customized by the called party would be played to the calling party while the called party is alerted; and the ring-to-me tone ID obtaining module is configured to obtain a ring-to-me tone ID from the RBT platform if the RBT precedence indicates calling party precedence and send the ring-to-me tone ID to the play instructing module;

the ring-to-you tone ID obtaining module is configured to obtain a ring-to-you tone ID from the RBT platform if the RBT precedence indicates called party precedence and send the ring-to-you tone ID to the play instructing module; and the play instructing module is configured to instruct a media resource server (MRS) to play a tone indicated by the received ring-to-me tone ID and customized by the calling party or a tone indicated by the received ring-to-you tone ID and customized by the called party to the calling party.

10. The AS of claim 9, further comprising a ring-to-you tone ID obtaining module, wherein:

the authenticating module is further configured to instruct the ring-to-you tone ID obtaining module to obtain a ring-to-you tone ID from the RBT platform if the RBT precedence indicates called party precedence;

the ring-to-you tone ID obtaining module is configured to obtain a ring-to-you tone ID from the RBT platform if the RBT precedence indicates called party precedence and send the ring-to-you tone ID to the play instructing module; and the play instructing module is further configured to instruct the media resource server (MRS) to play a tone indicated by the received ring-to-you tone ID to the calling party.

11. A method for implementing ringback tone (RBT) service comprising:

receiving, by a calling party's softswitch (SX), a first invite message initiated by a calling party;

obtaining, by the calling party's SX, a ring-to-me access code of the calling party;

sending, by the calling party's SX, a second invite message to an application server (AS), wherein the second invite message comprises the ring-to-me access code;

sending, by the AS, a third invite message to the calling party's SX, wherein the third invite message includes a fake calling party's media description to prevent called party's side from playing ringback tone to the calling party;

forwarding, by the calling party's SX, the third invite message to a called party;

receiving, by the calling party's SX, a ringing message reported by the called party;

forwarding, by the calling party's SX, the ringing message to the AS;

obtaining, by the AS, a ring-to-me tone ID or a ring-to-you tone ID after receiving the ringing message sent from the SX;

instructing, by the AS, a media resource server (MRS) to play a ringback tone indicated by the ring-to-me tone ID and customized by the calling party or a ringback tone indicated by the ring-to-you tone ID and customized by a called party to the calling party; and playing, by the MRS, the ringback tone indicated by the ring-to-me tone ID to the calling party.

12. The method for implementing RBT service of claim 11, wherein the obtaining the ring-to-me tone ID according to the ring-to-me access code after receiving a call request sent from the SX further comprises:

determining, by the AS, whether a RBT precedence preset by the calling party indicates calling party precedence or called party precedence after receiving the call request sent from the SX, wherein the calling party precedence means that a tone customized by the calling party would be played to the calling party while the called party is alerted, the called party precedence means that a tone customized by the called party would be played to the calling party while the called party is alerted; and obtaining, by the AS, the ring-to-me tone ID from an RBT platform according to the ring-to-me access code if the RBT precedence preset indicates calling party precedence.

13. A system for implementing ringback tone (RBT) service comprising a softswitch (SX), an application server (AS) and a media resource server (MRS), wherein:

the SX is configured to receive a first invite message initiated by a calling party, and obtain a ring-to-me access code of the calling party, and send a call request to the AS, wherein the call request comprises the ring-to-me access code, receive a second invite message sent by the AS, wherein the second invite message includes a fake calling party's media description to prevent called party's side from playing ringback tone to the calling party, forward the second invite message to a called party and connect the called party, receive a ringing message reported by the called party and forward the ringing message to the AS, wherein the SX is the calling party's SX;

the AS is configured to obtain a ring-to-me tone ID or a ring-to-you tone ID after receiving the ringing message sent from the calling party's SX, and instruct the MRS to play a ringback tone indicated by the ring-to-me tone ID and customized by the calling party or a ringback tone indicated by the ring-to-you tone ID and customized by a called party to the calling party; and the MRS is configured to play the ringback tone indicated by the ring-to-me tone ID and customized by the calling party or a ringback tone indicated by the ring-to-you tone ID and customized by a called party to the calling party.

14. The system for implementing the RBT service of claim 13, wherein the AS is further configured to determine whether a RBT precedence preset by the calling party indicates calling party precedence or called party precedence after receiving the call request sent from the SX, wherein the calling party precedence means that a tone customized by the calling party would be played to the calling party while the called party is alerted, the called party precedence means that a tone customized by the called party would be played to the calling party while the called party is alerted, and obtain the ring-to-me tone ID from an RBT platform according to the ring-to-me access code if the RBT precedence preset indicates calling party precedence.

* * * * *